United States Patent [19]

Sasajima et al.

[11] 3,919,046

[45] Nov. 11, 1975

[54] METHOD OF PRODUCING D-RIBOSE

[75] Inventors: Ken-ichi Sasajima, Hyogo; Masahiko Yoneda, Kobe, both of Japan

[73] Assignee: Takeda Chemical Industries, Ltd., Osaka, Japan

[22] Filed: Nov. 14, 1973

[21] Appl. No.: 415,561

Related U.S. Application Data

[63] Continuation-in-part of Ser. No. 370,759, June 18, 1973, abandoned.

[30] Foreign Application Priority Data

June 17, 1972 Japan.............................. 47-60612

[52] U.S. Cl................. 195/30; 195/29; 195/28 R; 195/96

[51] Int. Cl.$^2$......................................... C12D 13/02
[58] Field of Search............. 195/28 R, 29, 30, 31 R

[56] References Cited

UNITED STATES PATENTS 3,607,648   9/1971   Yoneda et al..................... 195/31 R

*Primary Examiner*—Alvin E. Tanenholtz
*Attorney, Agent, or Firm*—Wenderoth, Lind & Ponack

[57] ABSTRACT

D-ribose is produced by cultivating a strain belonging to the genus Bacillus whose transketolase activity is nil to cause said strain to elaborate and accumulate a large amount of D-ribose. The thus accumulated D-ribose can be recovered in a good yield.

11 Claims, No Drawings

METHOD OF PRODUCING D-RIBOSE

This application is a continuation-in-part of Ser. No. 370,759, filed June 18, 1973, now abandoned.

This invention relates to a method of producing D-ribose. By the present invention is provided a method of producing D-ribose, which comprises cultivating a D-ribose-producing microorganism belonging to the genus Bacillus whose transketolase activity is nil in a culture medium containing assimilable carbon and nitrogen sources as well as factors necessary for the growth of the strain, thereby causing said strain to elaborate and accumulate D-ribose and, then, recovering the D-ribose thus accumulated from the resultant culture broth.

As a constituent of nucleic acids, D-ribose occurs in all organisms, and ribitol, a reduction product of D-ribose, is present in vitamin $B_2$ and ribitol-teichoic acid, a constituent of cell walls. Thus, it is a very important substance physiologically. Furthermore, D-ribose and its derivatives have so far attracted a great deal of attention as starting materials for the synthesis of vitamin $B_2$ and the so-called nucleic acid condiments and, accordingly, the development of a commercial process for the production of D-ribose has been much desired.

The conventional methods for producing D-ribose include methods for extracting D-ribose from natural products and synthetic methods using furan, D-glucose, etc., as starting materials. There also are reports on the fermentative production of D-ribose, but the fermentation yield is extremely low. Thus, these processes are not fully satisfactory as commercial processes for the production of D-ribose.

The present inventors previously disclosed methods of producing D-ribose comprising utilization of Bacillus organisms.

These methods are concerned with the use of a D-ribose-producing microorganism of the genus Bacillus which requires L-tyrosine, L-tryptophan and L-phenylalanine for its growth (hereinafter, the microorganisms mentioned above are collectively referred to as "the amino acids-requiring microorganisms") or which lacking in transketolase activity (hereinafter, these microorganisms are referred to as "the transketolase-lacking microorganisms").

The former method in which are used the amino acids-requiring microorganisms is described in the specification of British Pat. No. 1,255,254 and the latter in which are used the transketolase-lacking microorganisms is described in Agricultural and Biological Chemistry Vol. 35, No. 4, page 509 (1971).

The amount of D-ribose obtained by these methods ranges from about 20 mg. to about 30 mg. per ml. of the fermented broth.

Both the amino acids-requiring microorganisms and the transketolase-lacking microorganisms have extremely low transketolase activity, especially the latter microorganisms were considered as lacking in transketolase, on the basis of the experimental results on the activities measured by the method of B. L. Horecker et al. [Journal of Biological Chemistry Vol. 223, page 1009. (1956)] described below.

I. Preparation of the Crude Enzyme Solution

The slant culture of a strain whose transketolase activity is to be determined is transferred into 200 ml. of a modified Spizizen's medium [Agricultural and Biological Chemistry Vol. 34, No. 3 page 381 (1970)] supplemented with shikimic acid, containing 0.4% of $(NH_4)_2SO_4$, 1.4% of $K_2HPO_4$, 0.6% of $KH_2PO_4$, 0.02% of $MgSO_4.7H_2O$, 0.0004% of biotin, 0.0068% of adenine, 0.014% of guanosine, 0.01% of shikimic acid, 0.5% of sorbitol and 0.5% of sodium L-glutamate as carbon sources in a 1-liter flask and incubated at 37°C on a rotary shaker. After 16-hour cultivation, the cells are harvested by centrifugation, washed with 0.01 M tris-(hydroxymethyl)aminomethane-HCl buffer solution (pH 7.5) containing 0.001 M mercaptoethanol and suspended in the same buffer solution so that the absorbancy at 650 m$\mu$ of the cell suspension may be 10. Then, lysozyme is added to the cell suspension at a concentration of 50 $\mu$g. per ml. The suspension is incubated at 37°C for 90 min. The cellular debris are removed by centrifugation ($1.2 \times 10^4$g). The clear solution is used as the enzyme solution.

II. Preparation of Reaction Solutions

Reaction Solution A

20 $\mu$ moles of D-ribose 5-phosphate, 0.5 $\mu$ mole of NADH, D-ribose 5-phosphate isomerase, D-ribose 5-phosphate epimerase, 0.66 unit of $\alpha$-glycerophosphate dehydrogenase containing triosephosphate isomerase and 60 $\mu$ moles of tris(hydroxymethyl)aminomethane-HCl buffer solution (pH 7.5).

Reaction Solution B

20 $\mu$ moles of $MgCl_2$, 0.43 $\mu$ mole of thiamine pyrophosphate, 40 $\mu$ moles of tris(hydroxymethyl)aminomethane-HCl buffer solution (pH 7.5), a given amount of the enzyme solution.

III. Assay of Transketolase Activity

Each reaction solution is incubated at 30°C for 10 min. and then the reaction solutions are mixed (the total volume is 2 ml.), and its absorbancy at 340 m$\mu$ was measured with the lapse of time.

The transketolase activity ($\mu$ mole/min/mg.protein) in the enzyme solution is expressed by the following formula:

$$-\Delta E_{340/min} \times \frac{V}{\Sigma \times d \times E \times p}$$

wherein $-\Delta E_{340/min}$ is the velocity of decrease of the net absorbancy of the mixed reaction solution at 340 m$\mu$ for 1 minute, $V$ is the total volume of the mixed reaction solution (2 ml.), $\Sigma$ is the molecular extinction coefficient of NADH at 340 m$\mu$ (6.22 cm.$^2$/$\mu$ mole), $d$ is the light path (1 cm.), $E$ is the volume of the enzyme solution (0.1 ml.), and $p$ is the weight of protein in the enzyme solution (mg./ml.).

As the test organisms were employed known strains of the amino acids-requiring microorganisms, i.e., Bacillus pumilus No. 503 and No. 537 and Bacillus subtilis No. 429 (British Pat. No. 1,255,254) as well as those of the transketolase-lacking microorganisms, i.e., Bacillus species Shi 5 and Shi 7 (Agricultural and Biological Chemistry Vol. 35, No. 4 page 509 (1971)). As the organisms to be compared were employed wild strains of Bacillus pumilus and Bacillus subtilis.

The results are shown in Table 1.

Table 1

| Organism | protein (mg./ml.) | optical density ($-\Delta E_{340}$ min.) | transketolase activity ($\mu$ moles/ min./mg. protein) | (%) |
|---|---|---|---|---|
| Bacillus pumilus (wild strain) | 2.2 | 0.165 | 0.24 | 100 |
| Bacillus pumilus No. 503 | 1.9 | <0.005 | 0.00 | 0 |
| Bacillus pumilus No. 537 | 1.8 | <0.005 | 0.00 | 0 |
| Bacillus subtilis (wild strain) | 2.0 | 0.080 | 0.13 | 100 |
| Bacillus subtilis No. 429 | 1.7 | <0.005 | 0.00 | 0 |
| Bacillus species Shi 5 | 1.8 | <0.005 | 0.00 | 0 |
| Bacillus species Shi 7 | 1.9 | <0.005 | 0.00 | 0 |

In the above assay of the transketolase activity, for the enzyme solution was employed the clear solution as it was, and the activity was found to be nil at least down to two decimal places. But no significant figure at the third decimal place was obtained by this method.

Further studies on the assay of the transketolase activity have led to the development of the method by which the calculation of the transketolase activity can be made correctly down to the third decimal place on a concentrated solution obtained by ultrafiltrating the enzyme solution in the above-mentioned assay method. That is, the enzyme solution was concentrated by the ultrafiltration method using ultrafiltration membrane, for example DIAFLO membrane PM 10 (trade mark of Amicon Corporation, U.S.A.), until its volume becomes about one-tenth of its original volume. And the present inventors used thus obtained concentrated solution as the enzyme solution.

This method made it clear that the transketolase activity of the amino acids-requiring microorganisms and of the transketolase-lacking microorganisms was not nil at third decimal place. Further improvement studies on strains and cultivation methods have led to the discovery that strains whose transketolase activity is nil at least down to the third decimal place are capable of accumulating a higher amount of D-ribose than the amino acids-requiring microorganisms and the transketolase-lacking microorganisms and can accumulate D-ribose in an amount of about 40 mg. to about 50 mg. per ml. of the culture broth obtained by the same manner as the known methods. It was further found that the strains whose transketolase activity is nil at least down to the third decimal place (hereinafter simply referred to as "the Microorganisms") accumulate a much greater amount of D-ribose, when they are cultivated in the presence of a dibasic organic acid. This invention is the culmination of the above findings.

The microorganisms employed in the practice of this invention can be obtained by using such wild strains as Bacillus pumilus, Bacillus subtilis, etc., as parent strains and subjecting them to radiation such as ultraviolet light, X-rays or $\gamma$-rays or a treatment with a mutagen such as nitrosoguanidine. Examples of the strain to be exploited in the practice of this invention include Bacillus pumilus No. 716, No. 735 and No. 783 and Bacillus subtilis No. 608 and No. 632. Table 2 shows the transketolase activities of these strains in comparison with Bacillus pumilus No. 503 and No. 537 and Bacillus subtilis No. 429, Bacillus species Shi 5 and Shi 7, employing the enzyme solution as it is (method I) and employing the concentrated enzyme solution (method II).

Table 2

| Organism | Relative transketolase activities | | | | | | |
|---|---|---|---|---|---|---|---|
| | Method I | | | | Method II | | |
| | protein (mg./ml.) | absorbancy ($-\Delta E_{340 m\mu}$) | transketolase activity | | protein (mg./ml.) | absorbancy ($-\Delta E_{340}$ min.) | transketolase activity |
| | | | ($\mu$ moles/min./ mg. protein) | (%) | | | ($\mu$ moles/min./ mg. protein) |
| Bacillus pumilus (wild strain) | 2.2 | 0.165 | 0.24 | 100 | | | 100 |
| Bacillus pumilus No. 503 | 1.9 | <0.005 | 0.00 (<0.01) | 0 | 19.1 | 0.030 | 0.005 | 2 |
| Bacillus pumilus No. 537 | 1.8 | <0.005 | 0.00 (<0.01) | 0 | 19.0 | 0.045 | 0.008 | 3 |
| Bacillus pumilus No. 716 | 2.0 | <0.005 | 0.00 (<0.01) | 0 | 20.3 | <0.005 | 0.000 (<0.001) | 0 |
| Bacillus pumilus No. 735 | 2.0 | <0.005 | 0.00 (<0.01) | 0 | 19.8 | <0.005 | 0.000 (<0.001) | 0 |
| Bacillus pumilus No. 783 | 2.2 | <0.005 | 0.00 (<0.01) | 0 | 23.0 | <0.005 | 0.000 (<0.001) | |
| Bacillus subtilis (wild strain) | 2.0 | 0.080 | 0.13 | 100 | | | | 100 |
| Bacillus subtilis No. 429 | 1.7 | <0.005 | 0.00 (<0.01) | 0 | 20.0 | 0.025 | 0.004 | 3 |
| Bacillus subtilis No. 608 | 2.2 | <0.005 | 0.00 (<0.01) | 0 | 22.4 | <0.005 | 0.000 (<0.001) | 0 |
| Bacillus subtilis No. 632 | 2.1 | <0.005 | 0.00 (<0.01) | 0 | 22.3 | <0.005 | 0.000 (<0.001) | 0 |
| Bacillus species Shi 5 | 1.8 | <0.005 | 0.00 (<0.01) | 0 | 19.5 | 0.040 | 0.007 | 3 |
| Bacillus species Shi 7 | 1.9 | <0.005 | 0.00 (<0.01) | 0 | 19.8 | 0.045 | 0.007 | 3 |

Table 3 shows the comparative ribose-producing abilities among the above strains by the following method.

One platinum wire-loopful of the slant culture of said test organism was inoculated into 20 ml. of a medium composed of 2% of sorbitol, 2% of corn steep liquor, 0.3% of dipotassium hydrogen phosphate, 0.1% of potassium dihydrogen phosphate, 100 $\gamma$/ml. of L-tryptophan, 100 $\gamma$/ml. of L-phenylalanine and 100 $\gamma$/ml. of L-tyrosine in a 200 ml. flask and incubated at 37°C for 16 hours on a rotary shaker at 200 rpm to prepare a seed culture.

Two milliliters of the seed culture was transfered to 20 ml. of a main culture medium (hereinafter called Medium A) composed of 15% of D-glucose, 1.5% of dried yeast, 0.5% of ammonium sulfate, 2% of calcium carbonate, 100 γ/ml. of L-tryptophan, 100 γ/ml. of L-phenylalanine and 100 γ/ml. of L-tyrosine in a 200 ml. creased flask and incubated at 37°C for 6 days on a rotary shaker at 200 rpm.

Amount of D-ribose accumulated in a culture broth was determined by the method described in Agricultural and Biological Chemistry, Vol. 35, page 509 (1971).

Table 3

| Organism | Relative ribose-producing abilities D-ribose accumulated mg./ml. |
|---|---|
| Bacillus pumilus (wild strain) | 0 |
| Bacillus pumilus No. 503 | 29 |
| Bacillus pumilus No. 537 | 28 |
| Bacillus pumilus No. 716 | 45 |
| Bacillus pumilus No. 735 | 49 |
| Bacillus pumilus No. 783 | 47 |
| Bacillus subtilis (wild strain) | 0 |
| Bacillus subtilis No. 429 | 26 |
| Bacillus subtilis No. 608 | 45 |
| Bacillus subtilis No. 632 | 48 |
| Bacillus species Shi 5 | 31 |
| Bacillus species Shi 7 | 27 |

The genetic characters of the microorganisms are that they cannot grow on such carbohydrates as D-gluconic acid, L-arabinose and D-ribose as exclusive carbon sources and they require for their growth shikimic acid or any substitutive substances such as L-tyrosine, L-tryptophan or L-phenylalanine.

Other genetic and biochemical characters of these strains are that in contrast to their parent organisms and to the known strains, their transketolase activities are below the presently known threshold of detection and their elaboration and accumulation of D-ribose are considerably high.

In cultivating the Microorganisms, one may use, as carbon sources, D-glucose, D-fructose, D-mannose, sorbitol, D-mannitol, sucrose, maltose, dextrin, soluble starch, spent molasses, etc., and, as nitrogen sources, various inorganic and organic nitrogenous compounds and substances containing them such as ammonium sulfate, ammonium nitrate, urea, corn steep liquor, dried yeast, meat extract, peptone, casein hydrolyzate and the like.

In addition to these ingredients, it is necessary that, as factors necessary for their growth, shikimic acid or its derivatives (for example, methyl ester, ethyl ester, etc.) are added to the medium.

Of course, as substitutes for shikimic acid or its derivatives, aromatic acids, i.e., L-tyrosine, L-tryptophan, L-phenylalanine and derivatives thereof (for example, methyl ester, ethyl ester, acetylate, benzoylate, etc.) may be added to the medium.

The above-mentioned aromatic amino acids need not necessarily be pure products. Thus, dried yeast, polypeptone, meat extract, casein hydrolyzate, etc., which contain aromatic amino acids can be used as well. Therefore, when any of the above-mentioned aromatic amino acids is used as a nitrogen source, one may employ it somewhat in excess of the requirement as a nitrogen source. The accumulation of D-ribose can be further increased by incorporating in the fermentation medium a dibasic organic acid having 2 to 5 carbon atoms such as malic acid, oxalic acid, maleic acid, fumaric acid, succinic acid, malonic acid or glutaric acid or an alkali salt thereof, for example. Generally the proportion of such acid is preferably within the range of 0.002 M to 0.2 M, more preferably about 0.003 M to 0.05 M.

Table 4 shows the effects of addition of such dibasic organic acids on the accumulation of D-ribose when *Bacillus pumilus* No. 735 was employed.

Table 4

| Dibasic organic acid | Accumulation of D-ribose (mg./ml.) Additive amount (g./l.) | | | | | | | | | |
|---|---|---|---|---|---|---|---|---|---|---|
| | 0 | 0.1 | 0.3 | 0.5 | 1.0 | 3.0 | 4.0 | 5.0 | 6.0 | 7.0 | 10. |
| Oxalic acid ($C_2O_4H_2$) | 49 | 48 | 56 | 55 | 53 | 55 | 54 | 40 | 30 | 18 | 15 |
| Malonic acid ($C_3O_4H_4$) | — | 50 | 54 | 56 | 58 | 57 | 56 | 53 | 50 | 50 | 45 |
| Succinic acid ($C_4O_4H_6$) | — | 48 | 53 | 57 | 56 | 58 | 57 | 56 | 52 | 52 | 40 |
| Maleic acid ($C_4O_4H_4$) | — | 50 | 55 | 60 | 58 | 59 | 59 | 57 | 55 | 45 | 37 |
| Fumaric acid ($C_4O_4H_4$) | — | 49 | 56 | 60 | 57 | 59 | 58 | 57 | 55 | 50 | 45 |
| Glutaric acid ($C_5O_4H_8$) | — | 50 | 52 | 54 | 55 | 54 | 55 | 55 | 54 | 45 | 38 |
| Adipic acid ($C_6O_4H_{10}$) | — | 48 | 50 | 48 | 30 | 32 | | 15 | | 10 | 10 |
| Suberic acid ($C_8O_4H_{14}$) | — | 51 | 35 | 28 | 15 | 17 | | 10 | | 12 | 8 |
| Sebacic acid ($C_{10}O_4H_{18}$) | — | 38 | 20 | 15 | 10 | 12 | | 15 | | 5 | 5 |

Table 5 shows the typical effects of addition of such dibasic organic acids, when *Bacillus pumilus* No. 716 and *Bacillus subtilis* No. 608 and No. 632 were employed.

Table 5

Relation of the addition of dibasic organic acids to the accumulation of D-ribose

| Dibasic organic acid | | Accumulation of D-ribose, mg./ml. | | |
|---|---|---|---|---|
| Compound | Amount mg./l. | Bacillus pumilus No. 716 | Bacillus subtilis No. 608 | Bacillus subtilis No. 632 |
| Oxalic acid ($C_2O_4H_2$) | 0 | 42 | 45 | 48 |
| | 500 | 56 | 55 | 56 |
| Malonic acid ($C_3H_4O_4$) | 100 | 45 | 45 | 47 |
| | 500 | 55 | 53 | 55 |
| Maleic acid ($C_4H_4O_4$) | 100 | 45 | 46 | 48 |
| | 500 | 59 | 57 | 55 |
| Fumaric acid ($C_4O_4H_4$) | 500 | 58 | 55 | 54 |
| Succinic acid ($C_4H_6O_4$) | 100 | 46 | 43 | 49 |
| | 500 | 55 | 52 | 53 |
| Glutaric acid ($C_5H_8O_4$) | 100 | 43 | 46 | 45 |
| | 500 | 58 | 55 | 54 |
| Adipic acid ($C_6O_4H_{10}$) | 500 | 45 | 44 | 37 |
| Suberic acid ($C_8O_4H_{14}$) | 500 | 27 | 35 | 39 |
| Sebacic acid ($C_{10}O_4H_{18}$) | 500 | 8 | 21 | 29 |

The results shown in Table 4 and Table 5 were obtained by the same culture method and assay method as used in the experiment shown in Table 3, except that the respective quantities of dibasic organic acids were added to the Medium A.

As will be seen from the above typical results, dibasic organic acids are conducive to increase yields of D-ribose, and maleic acid is particularly effective. In addition to the above-mentioned ingredients, magnesium sulfate, calcium phosphate, calcium carbonate, etc., can be further added.

The microorganism may be cultivated by procedures which are routinely followed for the cultivation of microorganisms, although submerged culture is most expedient. While the cultivation temperature, pH and time are largely optional, a sufficiently large amount of D-ribose is elaborated and accumulated if the strain is cultivated at 25° to 45°C and at pH 4.5 to 8.5 for about 24 to 120 hours.

The recommended procedure for recovering the D-ribose thus accumulated from the fermentation broth comprises removing the cells by filtration or centrifugation, treating the resultant filtrate or supernatant with activated carbon and ion exchange resins to decolorize and desalt it, respectively, concentrating the same and finally adding an organic solvent such as ethanol to the concentrate, thereby causing the desired compound to crystallize. In this connection, when carbohydrates other than the desired compound D-ribose are contaminated in the fermentation product, they may be removed by treating the product with glucose oxidase or with a strain of microorganism which does not utilize D-ribose but utilizes the particular carbohydrates.

The following examples are further illustrative of this invention, it being understood, however, that the invention is by no means limited thereto.

In the present specification the abbreviation IFO shows "Institute for Fermentation Osaka." The percentages are weight/volume unless otherwise described.

EXAMPLE 1

*Bacillus pumilus* No. 716 (IFO 13322) which had been obtained by exposing the parent strain to several doses of ultraviolet radiation was used to inoculate 10l. of a medium comprising 2% of sorbitol, 2% of corn steep liquor, 0.3% of dipotassium phosphate and 0.1% of monopotassium phosphate. The inoculated medium was incubated at 36°C for 24 hours to obtain a seed culture. This seed culture was then inoculated into 100l. of a medium comprising 15% of D-glucose, 1.0% of dry yeast, 0.5% of ammonium sulfate, 2.0% of $CaCO_3$ and 100 mg./l. of L-tryptophan and cultivated under aeration and agitation at 36°C for 72 hours, whereupon 45 g./liter of D-ribose was accumulated in the medium. This D-ribose fermentation broth was filtered to remove the cells and the filtrate was concentrated to approximately one-half of the original volume, followed by the addition of about one-quarter of its volume of ethanol. The precipitate was discarded and the solution was desalted with a cation and an anion exchange resin and, then, decolorized through a column of activated carbon. The decolorized solution was concentrated and, then, about 4 times its volume of ethanol was added. The procedure yielded 3.5 kg. of crystalline D-ribose.

EXAMPLE 2

*Bacillus subtilis* No. 608 (IFO 13323) which was obtained by exposing the parent strain to ultraviolet radiation and, then, subjecting it to a treatment with nitrosoguanidine, was used to inoculate 10l. of a seed medium of the same composition as that used in Example 1 and the inoculated medium was incubated under aeration and agitation at 36°C for 24 hours. The resultant seed culture was further inoculated into 100l. of a medium comprising 15% of D-glucose, 1.2% of dry yeast, 0.3% of ammonium sulfate, 2.0% of $CaCO_3$, 100 mg./l. of L-phenylalanine and 50 mg./l. of L-tyrosine, 50 mg./l. of L-tryptophan and 10 mg./l. of shikimic acid and incubated under sparging and stirring at 37°C for 84 hours, whereupon 45.5 g./liter of D-ribose was accumulated in the medium.

The cells were removed from the broth and the filtrate was treated by a procedure similar to that described in Example 1. The procedure yielded 3.5 kg. of crystalline D-ribose.

EXAMPLE 3

*Bacillus pumilus* No. 716 (IFO 13322) which was used in Example 1 was inoculated into 10l. of a medium comprising 2% of sorbitol, 2% of corn steep liquor, 0.3% of dipotassium phosphate and 0.1% of monopotassium phosphate, and cultivated at 37°C for 24 hours. The resultant seed culture was used to inoculate 100l. of a medium comprising 15% of D-glucose, 1.0% of dry yeast, 0.5% of ammonium sulfate, 2.0% of $CaCO_3$ 50 mg./l. of L-tryptophan, 50 mg./l. of L-tyrosine, 50 mg./l. of L-phenylalanine and 500 mg./l. of maleic acid. The inoculated medium was incubated under aeration and agitation at 37°C for 90 hours, by the end of which time the amount of D-ribose accumulated was 60 mg./ml. This broth was treated by a procedure similar to that described in Example 1 to harvest 4.5 kg. of crystalline D-ribose.

EXAMPLE 4

The same mutant strain of *Bacillus subtilis* as that used in Example 2, No. 608 (IFO 13323), was inoculated into 10l. of a medium comprising 2% of sorbitol, 2% of corn steep liquor, 0.3% of dipotassium phosphate and 0.1% of monopotassium phosphate, and cultivated at 36°C for 24 hours. The resultant seed culture was used to inoculate 100l. of a medium comprising 15% of D-glucose, 2.0% of dry yeast, 0.5% of ammonium sulfate, 2.0% of $CaCO_3$ and 750 mg./l. of maleic acid. The inoculated medium was incubated under aeration and agitation at 37°C for 72 hours, whereupon 55.5 g./liter of D-ribose was accumulated in the medium.

The above fermentation broth was treated by a procedure similar to that described in Example 1. The procedure yielded 4.3 kg. of crystalline D-ribose.

All strains used in the foregoing examples have been deposited at American Type Culture Collection, Maryland, U.S.A. under the accession numbers listed below:

| Strain | Accession No. |
| --- | --- |
| *Bacillus pumilus* No. 716 | ATCC 21951 |
| *Bacillus subtilis* No. 608 | ATCC 21952 |

What we claim is:

1. A method of producing D-ribose, which comprises cultivating a microorganism belonging to the genus Bacillus in a culture medium containing assimilable carbon and nitrogen sources and factors which are necessary for growth of the microorganisms, causing said microorganism to elaborate and accumulate D-ribose, and recovering the D-ribose thus accumulated from the resultant culture broth, the transketolase activity of the microorganism being less than 0.001 $\mu$ mole/min./mg. protein.

2. A method according to claim 1, wherein the factors which are necessary for growth of the microorganism are L-tyrosine or its derivative and L-tryptophan or its derivative and L-phenylalanine or its derivative.

3. A method according to claim 1, wherein the factor which is necessary for growth of the microorganism is shikimic acid or a derivative thereof.

4. A method according to claim 1, wherein the microorganism is cultivated in the culture medium at a temperature of from 25° to 45°C under aerobic condition.

5. A method according to claim 1, wherein a dibasic organic acid is added to the medium for the cultivation of the microorganism to cause the microorganism to elaborate and accumulate D-ribose.

6. A method according to claim 1, wherein the microorganism is a mutant of *Bacillus pumillus*.

7. A method according to claim 6, wherein the microorganism is *Bacillus pumillus* No. 716.

8. A method according to claim 1, wherein the microorganism is *Bacillus subtilis*.

9. A method according to claim 8, wherein the microorganism is *Bacillus subtilis* No. 608.

10. A method according to claim 5, wherein the dibasic organic acid is an aliphatic dibasic organic acid having 2 to 5 carbon atoms.

11. A method according to claim 10, wherein the aliphatic dibasic organic acid is a member selected from the group consisting of malic acid, oxalic acid, maleic acid, fumaric acid, succinic acid, malonic acid, glutaric acid and alkali salts thereof.

* * * * *